United States Patent [19]

Page

[11] Patent Number: 4,883,970
[45] Date of Patent: Nov. 28, 1989

[54] X-RAY INTENSIFYING SCREENS CONTAINING ACTIVATED RARE EARTH BORATES

[75] Inventor: Catherine J. Page, Eugene, Oreg.

[73] Assignee: E. I. Du Pont de Nemours and Company, Wilmington, Del.

[21] Appl. No.: 284,424

[22] Filed: Dec. 14, 1988

Related U.S. Application Data

[60] Division of Ser. No. 95,229, Sep. 11, 1987, which is a continuation-in-part of Ser. No. 897,040, Aug. 15, 1986, abandoned.

[51] Int. Cl.$^4$ .......................... C09K 11/78; H01J 1/63
[52] U.S. Cl. ......................... 250/483.1; 252/301.4 R; 428/690
[58] Field of Search ............. 252/301.4 R; 250/483.1; 428/690

[56] References Cited

U.S. PATENT DOCUMENTS 3,457,184  7/1969  Kobayashi et al. .......... 252/301.4 R

FOREIGN PATENT DOCUMENTS

| | | |
|---|---|---|
| 023068 | 1/1981 | European Pat. Off. . |
| 2422883 | 11/1975 | Fed. Rep. of Germany ... 252/301.4 R |
| 53-60386 | 5/1978 | Japan ............................ 252/301.4 R |
| 59-15951 | 4/1984 | Japan ............................ 252/301.4 R |
| 246752 | 12/1969 | U.S.S.R. ....................... 252/301.4 R |
| 1536637 | 5/1978 | United Kingdom . |

*Primary Examiner*—Jack Cooper

[57] ABSTRACT

X-ray phosphor consisting essentially of

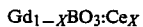

$$Gd_{1-x}BO_3:Ce_x$$

wherein X is 0.001 to 0.09 and process of preparation wherein reactant sources of gadolinium, boron and cerium, e.g., oxides, and flux, e.g., mixture of alkali metal halide and tetraborate, mixture of alkali metal sulfates, are mixed and fired at a temperature in excess of that required to melt the flux, leaching out the flux with water and drying to obtain substantially spherical particles, 0.5 to 20 μm in average diameter. The X-ray phosphor is useful in an X-ray screen which is used in combination with a silver halide, e.g., silver bromide emulsion.

7 Claims, No Drawings

X-RAY INTENSIFYING SCREENS CONTAINING ACTIVATED RARE EARTH BORATES

CROSS REFERENCE TO RELATED APPLICATION

This is a division of application Ser. No. 07/095229 filed Sept. 11, 1987 which is a continuation-in-part of Ser. No. 897,040 filed Aug. 15, 1986 now abandoned.

DESCRIPTION

1. Technical Field

More particularly this invention relates to X-ray intensifying screens containing activated rare earth borate X-ray phosphors.

2. Background Art

As is well-known in the art, phosphors are broadly used as visible indicators of invisible energetic particles. They may be otherwise divided as those that yield photoluminescence and cathode-luminescence, as taught by Leverenz in *An Introduction to Luminescence of Solids*, J. Wiley & Sons, Inc., N.Y. (1950), p. 399 et seq. Photoluminescent phosphors may be further categorized as those that can be excited by long-wave UV, short-wave UV, and high-energy photons, e.g., X-rays. As this author teaches at page 405 " . . . it is usually necessary to enlist the aid of a phosphor expert with broad experience in order to assure obtention of the best available phosphor for a particular purpose." Thus, it is no easy task to determine the proper phosphor for any desired use.

Since shortly after the discovery of X-rays, an X-ray conversion screen, also called an X-ray intensifying screen, has been used to convert X-ray images to visible or near-visible images. The key constituent of an X-ray intensifying screen is the phosphor layer which is conventionally made up by dispersion of the phosphor in a suitable binder and coated on a support. This layer is conventionally called the "active" layer of the screen. The phosphor material absorbs incident X-ray photons and produces, in their stead, photons of visible or near-visible energy. Such screens are now widely used in industry and in medicine. In use, the screen, mounted in a cassette with an appropriate photosensitive film, e.g., silver halide film, is placed directly in the X-ray beam with the object to be X-rayed between the X-ray source and the cassette bearing the combination of screen and imageable film. Thus, when photons are emitted from the screen, the film is exposed.

X-ray quality is commonly measured in terms of the voltage applied to the X-ray tube which generates X-rays. For medical use, X-rays are produced at tube potentials of about 30–140 killivolts (kVp). When the phosphor contained in the X-ray screen is struck by X-rays, a certain amount of the energy of the X-radiation is absorbed by the phosphor. The amount of energy absorbed depends upon the elemental composition of the phosphor and its density, and thus will vary from phosphor to phosphor. Since the phosphor emits visible light (fluoresces) in proportion to the amount of X-ray energy absorbed, and since it is this visible light which exposes the photosensitive film, a strongly x-ray absorbing phosphor system is greatly desirable.

Thus, to be useful, the X-ray phosphor material must stop X-rays effectively and must convert this energy efficiently so as to emit the maximum number of light photons. In other words, the ideal phosphor material should have both a high X-ray absorption coefficient and a high X-ray conversion efficiency.

There are a host of materials which can be used as phosphors but only a very few which are useful as phosphors in X-ray intensifying screens. Chief among these is CaWO, which has been widely used for many years as an X-ray screen phosphor. Lately, a number of new compounds have been used as phosphors in X-ray screens. These include, for example, BaFCl:Eu; $Gd_2O_2S$:Tb; LaOBr:Tm and the rare earth activated yttrium tantalates. Many of these phosphors can be used to make good quality X-ray screens which are useful in various medical radiological applications. For mammography applications the type of phosphor used in the preparation of an X-ray intensifying screen is particularly critical. Not only is the combination of emission and speed of importance but the low noise and high sharpness of the image obtained are particularly critical in order to detect minute cysts and growths in the breast area. The sharpness of the image is partly dependent on the particle size of the phosphor and its reproducibility in substantially small particle size. Not all of the previously described phosphors meet these requirements.

It has been found that phosphors of specific composition can be prepared having an excellent combination of emission, speed and reproducible small particle size which can yield sharp images when incorporated into an X-ray intensifying screen.

DISCLOSURE OF THE INVENTION

In accordance with this invention there is provided an X-ray intensifying screen comprising a support, X-ray phosphor particles on the support, and a binder for said phosphor particles, the improvement wherein the X-ray phosphor consists essentially of

$Gd_{1-x}BO_3:Ce_x$ wherein X is 0.001 to 0.09.

The X-ray phosphor of this invention has the formula set out above. Preferably X in the formula ranges from 0.002 to 0.05. A particularly preferred phosphor is of the formula:

$Gd_{0.99}BO_3:Ce_{0.01}$.

The phosphor is made by mixing or milling the reactant sources of gadolinium, boron and cerium in a flux or a mixture of alkali halide and an alkali tetraborate of a mixture of alkali metal sulfates, firing this mixture at a temperature greater than that necessary to melt said flux, and then leaching out said flux with water and drying to yield a free-flowing, white, crystalline material wherein the particles are substantially spherical in shape in the range of about 0.5 to 20 μm in average diameter. Such a phosphor can be admixed easily with conventional binders and packs in easily when said mixture is coated on a support.

Within the practice of this invention, the reactants, e.g., stoichiometric amounts of gadolinium, cerium and boron oxides along with a flux comprising ca. 25 to 85% by weight NaCl or KCl and 15 to 75% by weight of $Na_2B_4O_7$, based on the total weight of flux are mixed or milled in a suitable device, e.g., ball mill in agate grinding bowl with agate balls. The amount of flux used ranges in an amount of 25 to 100%, generally about 50%, based on the weight of reactants. The mixture is placed in a crucible, e.g., alumina, etc., and is fired at a temperature of ca. 800°–1200° C. for about 3–12 hours. The size of the phosphor particles is dependent on the firing temperature, e.g., small sizes such as below 10 μm are achieved when firing is accomplished at relatively low temperatures, e.g., 900° C. and below. Another useful flux combination is a mixture of alkali metal sulfates, e.g., $Li_2SO_4$ and $K_2SO_4$ in respective amounts of about 20 to 90% by weight and 10 to 80% by weight, based on the total weight of flux. It has been found that the speed of the phosphor obtained using this particular flux combination is slightly less than with the preferred flux combinations set forth above. By using an excess of boron reactant, e.g., $B_2O_3$ or $H_3BO_3$, in an amount of about 5 to 20% excess in the reaction mixture the problem can be alleviated. After firing, the excess salts (flux) are removed by extraction with water to yield a crystalline, white powder. This powder (the phosphor) can then be suitably dispersed, e.g., by solvent ball-milling in a binder, e.g., polyvinylbutyral, for example, and the resulting mixture coated on a support, e.g., polyethylene terephthalate, to yield an X-ray intensifying screen. Optionally, and preferably, a reflective under-layer and a topcoat or protective layer are present in the screen. A typical X-ray intensifying screen has the following structure (in order):

1. a flexible support, e.g., polyethylene terephthalate,
2. an optional reflective layer, e.g., $TiO_2$ dispersed in a suitable binder,
3. an active layer, e.g., the phosphor dispersed in a suitable binder such as polyvinyl butyral, and
4. an optional topcoat or protective layer.

Screens made as above are eminently suitable for use in medical X-ray applications. It is preferred that a double-side coated, gelatino silver halide element is exposed in a cassette with two screens, one on each side of the silver halide element. A common mode for use in mammography is a single-side coated, gelatino silver halide element in conjunction with a single intensifying screen. The phosphor of this invention emits light in the region of 350 to 450 nm, e.g., UV-blue, and thus many of the conventional silver halide X-ray products can be used therewith since these silver halide elements are not usually dye sensitized. For example, it is particularly useful with silver bromide emulsion photographic film. Of course, it can be used with silver halide emulsions that are blue-sensitized.

Supports useful in the intensifying screen are well-known. These include cardboard, thin metal or other flexible materials such as polyesters which are eminently suitable. These materials also include baryta; cellulose acetate; cellulose propionate, cellulose acetate propionate; aluminum, etc. The supports should be permeable to X-rays and preferably have a thickness of about 0.00025 inch (0.0064 cm) to about 0.30 inch (0.76 cm) with thickness of about 0.01 inch (0.025 cm) being preferred.

A reflective layer is conventionally interposed between the support and the active (phosphor containing) layer. A preferred layer is made by dispersing a white pigment, e.g., $TiO_2$, in a suitable binder, e.g., polyvinylbutyral. The phosphor or active layer is applied supra to this reflective layer which is usually included to increase the output of the screen. The active layer, made as described herein, usually comprises 70–95% phosphor and 30–5% binder by weight and may include a number of other materials such as dispersing agents, etc.

A protective layer or topcoat made of any of the prior art materials may be applied over this active layer; in fact, the presence of such a layer is preferred. This layer serves not only to protect the active layer which is made of expensive phosphor, but to provide antistatic qualities and contact improvements between the screen and the photosensitive elements employed therewith. A preferred mode of the invention is described in Example 1.

INDUSTRIAL APPLICABILITY

The X-ray phosphors of this invention are useful for the manufacture of X-ray intensifying screens. The phosphors possess an ultraviolet-blue narrow-band emission centered at 410 nm with a shoulder at 385 nm. The combination of this emission with good speed and small particle size make X-ray intensifying screens containing the phosphors attractive for high sharpness mammography applications as well as other medical radiological applications. The screens are useful with silver halide, particularly silver bromide, emulsion photographic film and also such photographic films having blue sensitization.

EXAMPLES

The following examples, wherein the percentages are by weight except where noted, illustrate but do not limit the invention. The phosphor particle sizes in the Example below are determined from evaluating pictures obtained by using a Scanning Electron Microscope (SEM). Relative speeds of the phosphors in the examples below are measured using an apparatus which consists of a 30 kVp molybdenum x-ray source, a lead-lined sample chamber, optics, a monochrometer and a photodetector. Relative intensity emission (RIE) values are obtained by measuring the total light output of the particular phosphor at all wavelengths (without the monochrometer). Relative speed values are the ratio of the sample RIE to that of a standard $CaWO_4$ screen (Cronex ® Hi-Plus intensifying screen, E. I. du Pont de Nemours and Company, Wilmington, DE).

EXAMPLE 1

A phosphor of the following composition: $Gd_{0.99}BO_3Ce_{0.01}$, representing this invention, was prepared by milling for 30 minutes stoichiometric amounts of gadolinium, cerium and boron oxides and thoroughly mixing these oxides with a salt/flux mixture of 75% NaCl and 25% $Na_2B_4O_7$:

| Ingredient | Amount (g) |
| --- | --- |
| $Gd_2O_3$ | 3.589 |
| $CeO_2$ | 0.034 |
| $B_2O_3$ | 0.696 |
| NaCl | 1.620 |
| $Na_2B_4O_7$ | 0.540 |

The total weight of the flux represented one half the weight of the reactant mixture. The mixture of flux and oxides was placed into a furnace and fired at 900° C. for about 4 hours. After firing, the mixture was extracted repeatedly with water to remove the excess salts. The resultant material was white, crystalline and X-ray photoluminescent having emission lines at about 410 nm and about 385 nm. The particle size was about 1–7 μm in diameter and substantially spherical in shape.

A small, X-ray test screen was then prepared from this material by first passing the phosphor through a 80-mesh screen (pore size 180 μm) to remove any large particles and/or agglomerates and then dispersing 6.2 g of the phosphor in 1.0 g of a polyvinylbutyral binder using 1.0 ml of butyl acetate as a solvent. This dispersed phosphor was then coated on an unlacquered plain white paper support, NWK-2, Leneta Co., Hohokus, NJ using a doctor knife to a wet coating thickness of about 0.030 inch (0.76 mm) and producing a dry thickness of 0.008 to 0.010 inch (0.20 to 0.25 mm). Relative speed values were about 1.2× that of a Du Pont Cronex ® Hi-Plus Screen indicating that this phosphor has good speed.

EXAMPLE 2

Example 1 was repeated except the phosphor ingredients were changed as follows to yield a phosphor with the following composition:

$Gd_{0.995}BO_3Ce_{0.005}$

| Ingredient | Amount (g) |
|---|---|
| $Gd_2O_3$ | 3.607 |
| $CeO_2$ | 0.017 |
| $B_2O_3$ | 0.696 |

The amount of flux used, the firing conditions, etc., were the same as described in Example 1. Two screen samples were prepared from this material at wet coating thicknesses of 0.030 (0.76 mm) and 0.010 inch (0.25 mm), respectively (dry thicknesses were about 0.20 mm to 0.25 mm and about 0.075 mm, respectively, and these screens were tested as described above. The screens had a relative speed value of about 1.1× that of Du Pont Cronex ® Hi-Plus Screen and about 0.8× that of Du Pont Cronex ® Hi-Plus Screen, respectively, indicating that it is possible to control the speed of the phosphor by varying the coating weight.

EXAMPLE 3

A phosphor similar to that described in Example 1 was prepared except that a flux comprising 80 mole percent $Li_2SO_4$ and 20 mole percent $K_2SO_4$ was used in place of the flux of Example 1, and 10% excess boron oxide reactant was used. The ingredients were present in the following amounts:

| Ingredient | Amount (g) |
|---|---|
| $Gd_2O_3$ | 3.589 |
| $CeO_2$ | 0.034 |
| $B_2O_3$ | 0.766 |
| $Li_2SO_4$ | 1.574 |
| $K_2SO_4$ | 0.613 |

A firing temperature of 1050° C. was used. After firing for about 4 hours, the excess salts were removed as described in Example 1 and the resulting phosphor was a white, crystalline material which had photoluminescence at about 410 nm and about 385 nm with spherical particles of about 2–10 μm in diameter. Screens made from this material had relative speeds comparable to those of Example 1.

Control

A phosphor having the following composition:

$Gd_{0.98}BO_3Ce_{0.02}$ was made by milling the following stoichiometric amounts of gadolinium and cerium oxides with an excess amount of boron oxide (ca. 10% more than the stoichiometric amount):

| Ingredient | Amount (g) |
|---|---|
| $Gd_2O_3$ | 3.589 |
| $CeO_2$ | 0.034 |
| $B_2O_3$ | 0.766 |

The milled oxides were then fired in a recrystallized alumina crucible without flux at 1200° C. for about 4 hours. The product was a crystalline, white powder which photoluminescenced at the same wavelengths as the phosphors of Examples 1 to 3, but with a lower speed, about 0.8× that of Du Pont Cronex ® Hi-Plus Screen. The particles were of irregular shape and size of about 1 to 10 μm in diameter. The lower speed and less desirable size and shape indicates the necessity of using a flux in the preparation of a phosphor of this invention.

EXAMPLE 4

The following ingredients were placed into an agate ball mill and mixed for 60 minutes:

| Ingredient | Amount (g) |
|---|---|
| $Gd_2O_3$ | 68.540 |
| $CeO_2$ | 0.660 |
| $B_2O_3$ | 13.306 |
| NaCl | 26.420 |
| $K_2B_4O_7$ | 14.446 |

After thoroughly ball-milling, the mixture was placed in an alumina crucible which was then placed in an oven and the temperature was increased at a rate of 10° C. per minute until the final temperature of 900° C. was reached. The mixture was then held at that temperature for 12 hours and the temperature subsequently lowered at a rate of 4° C. per minute. The resulting powder was then dissolved and washed in boiled, distilled water under a nitrogen environment to remove the flux and this material was then vacuum dried at 50° C. After drying, the material was sieved through a 325 mesh screen and subsequently dispersed in a conventional X-ray screen binder in the same manner as described in Example 1, above. After dispersing, the material was coated on ca. 0.007 inch (0.18 mm) polyethylene terephthalate support at a dry coating thickness of ca. 0.010 inch (0.25 mm). This coating was overcoated with a conventional topcoat (e.g., cellulose acetate dispersed in as solvent) as described in Brixner, U.S. Pat. No. 3,895,157 and the resulting approximately 5×12 inches (12.7×30.48 cm) X-ray screen was thoroughly dried.

Exposures were then made using samples of a conventional, fine grain, blue sensitive medical X-ray film used in mammography. Exposures were made at 70 kV, 10 ma and 0.2 second for resolution results, and 70 kV, 40 ma and 1.2 seconds for noise results. The exposures were made using a conventional X-ray source and through a standard aluminum filter. For speed, a standard stepwedge was employed and for noise and sharpness, a high resolution target was used. For control purposes, a commercial Du Pont Quanta ® III X-ray screen was used. After exposure, all the films used were then developed, fixed, washed and dried using conventional developers and fixers and in a manner well-known to those skilled in the art. Results show that although the screen made using the phosphor of this invention was somewhat slower than the control, a decrease of ca. 5% in noise and an increase of better than 40% in resolution was also obtained.

I claim:

1. An X-ray intensifying screen comprising a flexible support, particles of an X-ray phosphor on the support, and a binder for said phosphor particles, wherein the X-ray phosphor consists essentially of $$Gd_{1-x}BO_3:Ce_x$$

wherein X is 0.001 to 0.09.

2. An X-ray intensifying screen according to claim 1 wherein the X-ray phosphor is of the formula:

$$Gd_{0.99}BO_3:Ce_{0.01}.$$

3. An X-ray intensifying screen according to claim 1 wherein the X-ray phosphor particles are substantially spherical having an average diameter in the range of about 0.5 to 20 μm.

4. A combination of the X-ray intensifying screen of claim 1 with at least one silver halide emulsion photographic film.

5. A combination according to claim 4 wherein the silver halide emulsion is a silver bromide emulsion.

6. A combination according to claim 4 wherein the silver halide emulsion is blue-sensitized.

7. An X-ray intensifying screen according to claim 1 wherein X is 0.002 to 0.05.

* * * * *